(12) United States Patent
Kronenberger

(10) Patent No.: US 6,235,326 B1
(45) Date of Patent: May 22, 2001

(54) EDIBLE SNACK CHIP AND METHOD OF MAKING THE SAME

(75) Inventor: Robert A. Kronenberger, Deerfield, IL (US)

(73) Assignee: American Needle, Buffalo Grove, IL (US)

( * ) Notice: Subject to any disclaimer, the term of this patent is extended or adjusted under 35 U.S.C. 154(b) by 0 days.

(21) Appl. No.: 08/108,932

(22) Filed: Aug. 18, 1993

(51) Int. Cl.$^7$ .................................................. A23L 1/216
(52) U.S. Cl. .................. 426/143; 426/144; 426/438; 426/514; 426/503; 426/560; 426/637
(58) Field of Search .................................. 426/138, 143, 426/144, 297, 438, 499, 502, 503, 514, 637, 439, 808, 560

(56) References Cited

U.S. PATENT DOCUMENTS

| | | | |
|---|---|---|---|
| 714,310 | * | 11/1902 | Laws ........................................ 99/588 |
| 844,266 | * | 2/1907 | Dotson ................................... 99/588 |
| 1,039,800 | * | 5/1912 | Pysher ................................... 99/588 |
| 1,529,684 | * | 3/1925 | Behrens ................................. 99/588 |
| 2,147,098 | * | 2/1939 | Humphrey ............................. 426/94 |
| 3,384,496 | * | 5/1968 | Robinson et al. .................... 426/639 |
| 4,247,567 | * | 1/1981 | Momiyama .......................... 426/302 |
| 5,009,902 | * | 4/1991 | Mercenari ............................. 426/138 |

FOREIGN PATENT DOCUMENTS

2091146 * 4/1987 (JP) .

OTHER PUBLICATIONS

C.L. Barnhart, Ed., The American College Dictionary, Random House, New York, 1970 pp. 6.*

* cited by examiner

Primary Examiner—Curtis E. Sherrer
(74) Attorney, Agent, or Firm—Wood, Phillips, VanSanten, Clark & Mortimer

(57) ABSTRACT

A method of forming an edible chip by providing a sheet layer of flexible, edible material, bending the sheet layer about a fold line to define first and second sheet layer walls which abut to each other at a location spaced from the fold line, and treating the sheet layer to rigidify the sheet layer with the first and second sheet layer walls bent about the fold line.

19 Claims, 2 Drawing Sheets

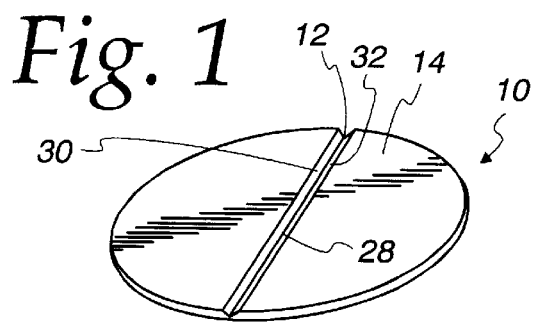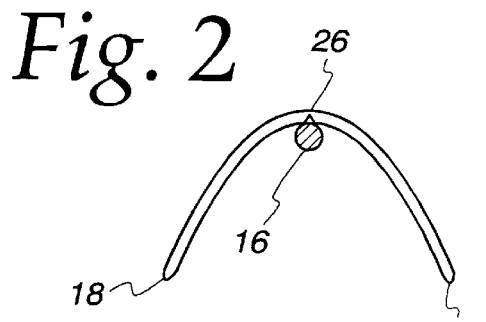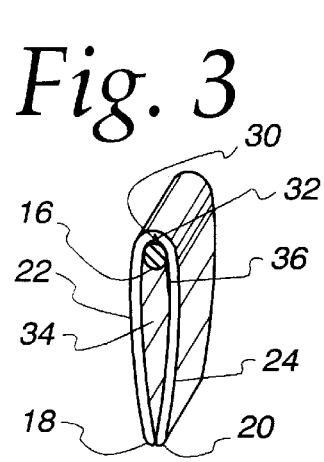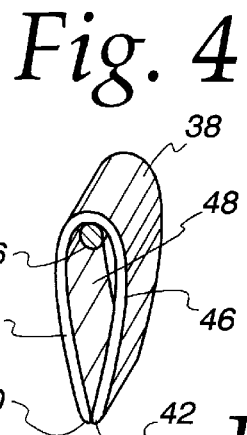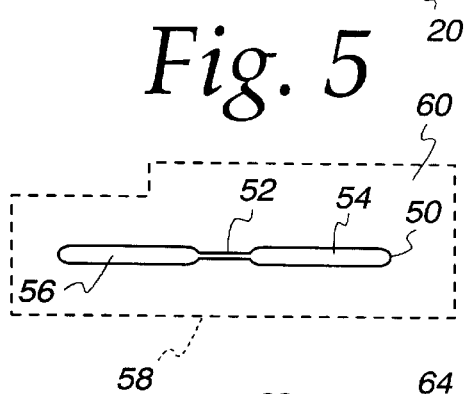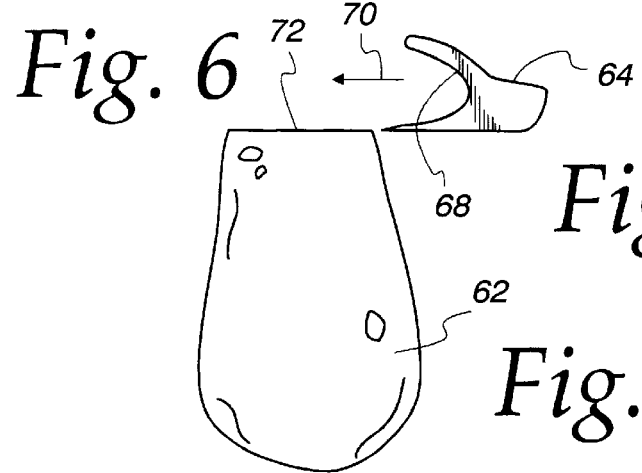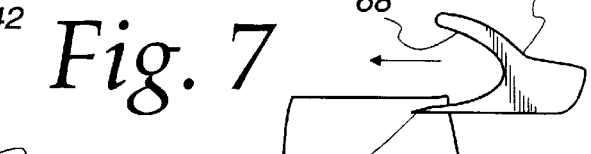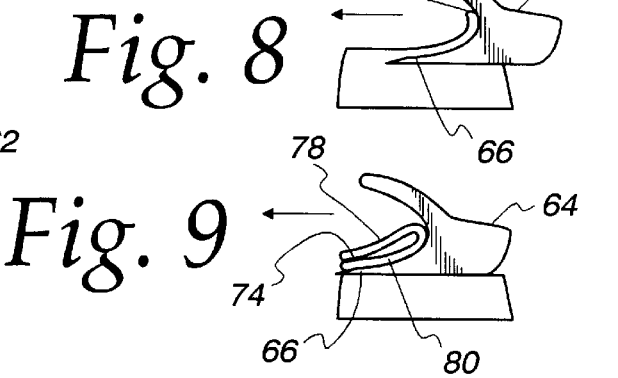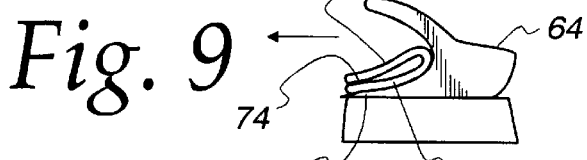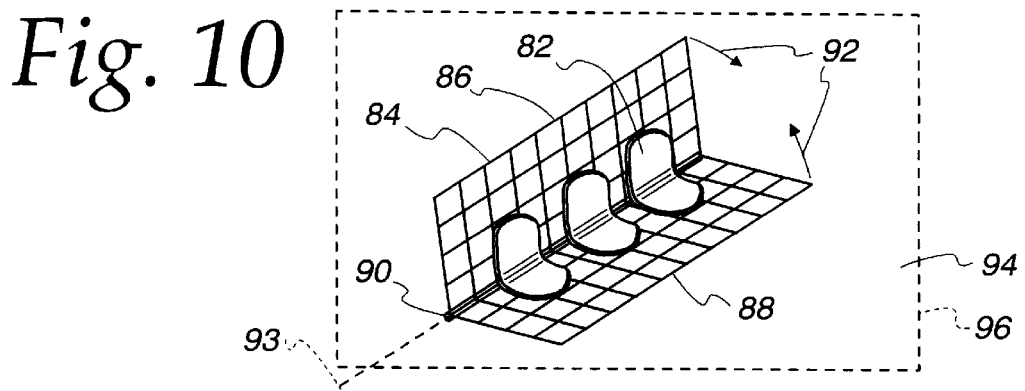

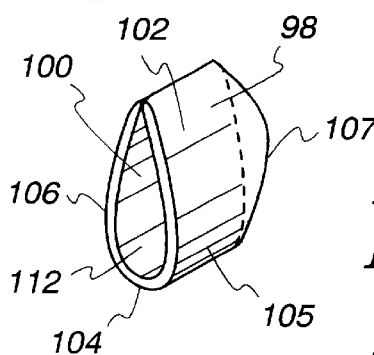
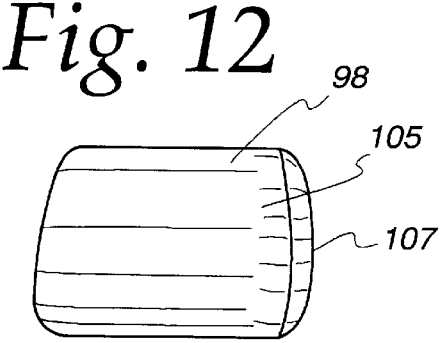
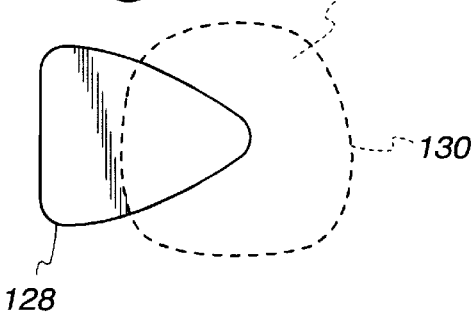
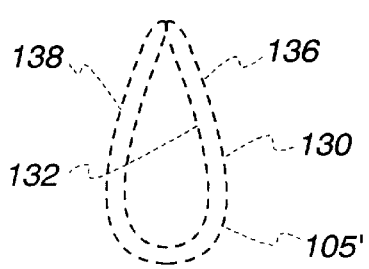
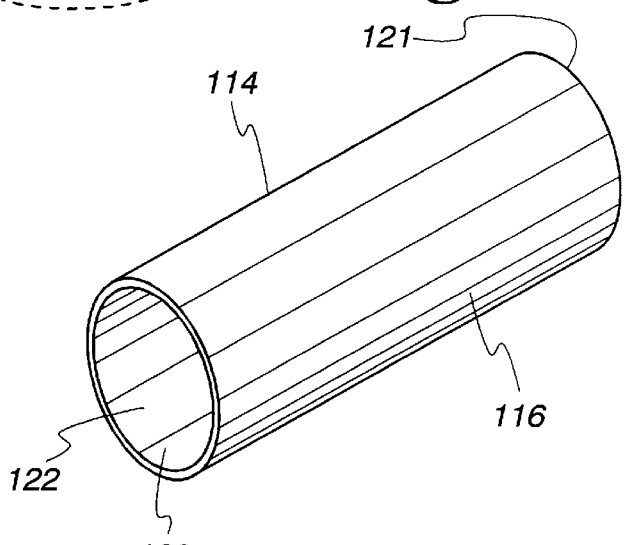
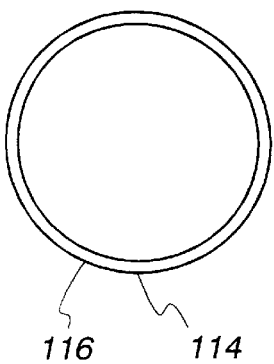
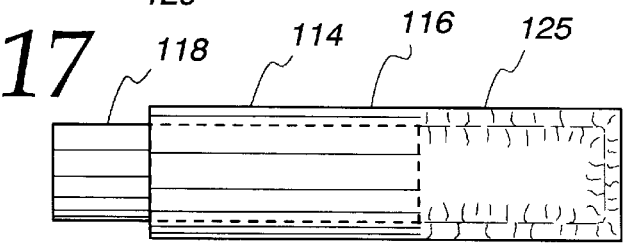
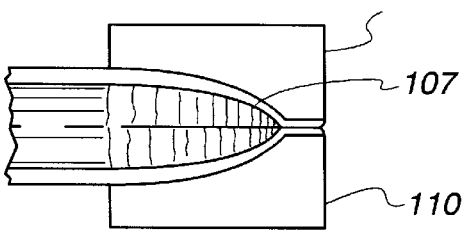

EDIBLE SNACK CHIP AND METHOD OF MAKING THE SAME

BACKGROUND OF THE INVENTION

1. Field of the Invention

This invention relates to edible snack chips, such as those made from potato slices or from a sheet of corn-based material and, more particularly, to a chip that is formed in such a manner to give it rigidity and allow it to pick up thick flavoring dips without breaking.

2. Background Art

The snack chip industry is highly competitive, with there currently being a multitude of different chip flavors and shapes available. One of the most popular snacks remains the potato chip that is produced most commonly by deep frying thin slices of potato. The potato can be either flat cut or ribbed, with the latter being necessarily thicker and more rigid after cooking.

For the most part, the flat cut and ribbed potato slices develop a wavy shape or curl slightly at the edges after cooking. The end shape is determined by a number of factors, including the moisture content of the uncooked slice, the composition thereof, imperfections therein, etc.

To enhance the taste of the snack chips, various dips are available on the market. These dips range from those with a very thick consistency, such as those that are sour cream based, to those with the consistency of water, such as salsas.

In many cases, the chips turn out to be incompatible with the dips intended therefor. For example, flat sliced potato chips, on which the thickest of dips are used, typically are the thinnest. The thin potato slice can be flash cooked, while retaining little of the cooking oil, and is therefore light and crispy, which is preferred by most consumers.

However, the thin, crispy chip is brittle and thus does not lend itself to the picking up of thick dips. If one attempts to scoop dip from a bowl, the chip tends to snap off. The result is that many small pieces of chip remain in the dip, which makes it less appetizing.

Alternatively, one can align the plane of the chip vertically and press it into the dip. The withdrawn chip generally has only a thin layer of dip adhered thereto, which in many cases does not satisfy the consumer.

While the thicker chip overcomes some of the above problems, it takes longer to cook, is heavier, retains more cooking oil, and resultingly does not have the same crisp texture as the thinner chips.

Those chips, such as corn-based chips, that are intended to be thicker, are generally used with thinner dips, such as salsa, with which the above problems are not contended. Generally the thicker chips are unsuitable for picking up thinner dips.

For example, salsas usually have a water base with chunks of seasoned vegetable therein. If one uses a flat chip to pick up this type of dip, the liquid base material runs freely off of the chip, so that the consumer is normally left with nothing more than the suspended solids on the chip. Often, a consumer performs a balancing act to keep as much of the liquid as possible on the chip. The consumer in aiding this endeavor, commonly seeks out a chip with a depression that acts as a receptacle for the dip.

The liquid that drips off of the chips commonly is spilled on clothing and furniture and, aside from the inconvenient mess it causes, may permanently stain fabrics.

Other types of chips are also available on the market. For example, some chips are formed to define a closed, hollow shell, that may be round or cylindrical. While interesting hollow shapes can be formed, the dip does not migrate to within the hollow. Consequently, the hollow shape is more advantageous from an aesthetic, rather than a functional, standpoint.

Other efforts are frequently focused on making interesting precooked shapes, such as circular, triangular, square, rectangular, etc. This generally does little in varying the functional aspects of the chips.

SUMMARY OF THE INVENTION

In one form, the invention contemplates a method of forming an edible chip by providing a sheet layer of flexible, edible material, bending the sheet layer about a fold line to define first and second sheet layer walls which abut to each other at a location spaced from the fold line, and treating the sheet layer to rigidify the sheet layer with the first and second sheet layer walls bent about the fold line.

Accordingly, consistently bent chips can be formed which can be made thin, so as to be crisp, yet sufficiently rigid to allow scooping of dips without breakage. This rigidity is a result of the folded configuration of the chip.

The sheet layer can be made by slicing a potato, or the like, or can be preformed by extruding, rolling, or otherwise forming paste or dough into a sheet.

In certain cases, it is desirable to have a receptacle for dip, or the like, directly in the chip. This can be done by maintaining a space between a portion of the first and second sheet layer walls. In one form, a cup-shaped receptacle is defined between the first and second walls, with there being an unobstructed entryway thereto as to allow dip to be placed in the receptacle.

In one form, the spacing is accomplished by placing a spacing element between the first and second sheet layer walls so as to define the receptacle.

The sheet layer is treated preferably by immersion in a heated fluid, such as air or oil. In the latter case, the oil is usually heated to at least 300° F. before immersion.

In another form of the invention, a cutting element is provided with a blade and a deflecting surface. The cutting element is configured so that as the cutting element is advanced into an edible material, such as a potato, the cutting blade slices the potato and the deflecting surface bends the potato slice against itself as an incident to the advancement of the cutting element.

To facilitate bending of the sheet layer, the sheet layer can be physically altered. In one form, the sheet layer is made more flexible at the fold line, as by making it thinner, or otherwise. The thinner portion acts as a hinge.

The invention further contemplates a method of forming an edible chip including the steps of providing a sheet layer of flexible, edible material and bending the sheet layer about a fold line to define first and second sheet layer walls.

In one form, the sheet layer has no dimension that is over four inches.

The invention further contemplates a method of forming an edible chip including the steps of providing a sheet layer of flexible, edible material having a non-uniform thickness so that the sheet layer has a tendency to bend along the fold line, and treating the sheet layer so as to cause the sheet layer to bend along the fold line and rigidify in a final state.

The invention further contemplates an edible chip having a sheet layer made from an edible material that is pliable in a first state and shape retentive in a second state, with the sheet layer being bent about a fold line in its first state so that the first and second walls defined by the sheet layer abut to each other at a location spaced from the fold line.

Still further, the invention contemplates an edible chip having a sheet layer made from an edible material that is pliable in a first state and shape retentive in a second state, with there being structure on the sheet layer for facilitating bending of the sheet layer at a fold line to allow first and second walls on the sheet layer to bend relative to each other about the fold line in response to the sheet layer being immersed in a heated fluid.

BRIEF DESCRIPTION OF THE DRAWINGS

FIG. 1 is a perspective view of a sheet of edible material used to form chips according to the present invention and having a weakening groove on one side thereof;

FIG. 2 is a side elevation view of the sheet of FIG. 1 draped over a support therefor;

FIG. 3 is a perspective view of the sheet in FIG. 2 in a final state;

FIG. 4 is a view as in FIG. 3 with a sheet draped over a support as in FIG. 3 but with there being no weakening groove in the sheet;

FIG. 5 is a side elevation view of another sheet with a thin center portion defining a line of weakening for bending;

FIG. 6 is a side elevation view of a potato with a cutting element, according to the present invention, being advanced thereagainst to remove a slice from which a chip is formed;

FIG. 7 is a fragmentary elevation view of the top portion of the potato in FIG. 6 and showing the cutting element advanced partially through the potato;

FIG. 8 is a view as in FIG. 7 with the cutting element further advanced;

FIG. 9 is a view as in FIGS. 7 and 8 with the potato slice completely severed form the potato and folded against itself;

FIG. 10 is a perspective view of a rack used to bend and facilitate cooking of edible sheets according to the invention;

FIG. 11 is a perspective view of a folded edible sheet defining a cup-shaped receptacle;

FIG. 12 is a side elevation view of the edible sheet in FIG. 11;

FIG. 13 is a side elevation view of a shaping element used to maintain a space between adjacent walls on a folded sheet;

FIG. 14 is an end elevation view of a sheet element as formed with the shaping element of FIG. 13;

FIG. 15 is a perspective view of an extruded sheet formed into a cylindrical shape;

FIG. 16 is an end elevation view of the sheet layer in FIG. 15;

FIG. 17 is a side elevation view of the sheet in FIGS. 15 and 16 with a shaping element extended therein to define a receptacle between facing walls on the sheet; and FIG. 18 is a side elevation view of a mold used to selectively pinch portions of the sheet in FIGS. 15 through 17.

DETAILED DESCRIPTION OF THE DRAWINGS

In FIG. 1, a sheet layer made of flexible edible material is shown at 10. The exact shape of the sheet layer 10 is a design consideration. The circular shape shown is only one shape contemplated by the invention. The sheet layer 10 can be made from any of a number of different edible materials. For example, the sheet layer could be a slice of a potato, potato paste or dough, a corn-based material, etc.

According to the invention, the sheet layer 10 is bent in a predetermined fashion to make it sufficiently rigid and of a shape to be highly suitable for picking up flavored dips. More particularly, by bending the sheet layer, the sheet layer can be made relatively thin, so as to be light and crisp, yet as bent it has sufficient rigidity to allow it to scoop up a relatively thick dip without breaking off.

There are several different ways contemplated by the invention for effecting bending of the sheet layer 10. In FIGS. 1–3, the sheet layer 10 has a V-shaped groove 12 in one side 14 thereof, which groove 12 approximately bisects the diameter of the sheet layer 10. The sheet layer 10 is then draped over an elongate rod/support 16 so that the diametrically opposite ends 18,20 droop under the weight of the sheet layer 10 and fold inwardly against each other.

In the end product, spaced walls 22,24 preferably abut to each other at the ends 18,20, or are in close proximity. This bending is facilitated by the groove 12 which defines a weakened portion 26 which acts as a hinge and defines a fold line 28 for the sheet layer 10. The groove 12, in addition to weakening the sheet layer 10, defines a void which allows the sheet layer 10 to be collapsed fully against itself without significant bowing. The groove 12 can be constructed so that the edges 30,32, bounding the groove 12, abut to each other in the final state for the sheet layer 10, as shown in FIG. 3.

The sheet layer 10, in the final state of FIG. 3, has a slight space/receptacle 34 between the walls 22, 24, with there being an unobstructed entryway 36 to the space 34.

FIG. 4 shows a modified form of sheet layer 38 that is cut the same as the sheet layer 10 but lacks the groove 12. The sheet layer 38 is draped over a support 16 in like fashion so that the ends 40,42 of facing walls 44,46 abut. Because the groove 12 is absent, the walls 44,46 tend to bow at their mid portion more prominently than the walls 22,24 on the sheet layer 10 so that a larger receptacle 48 is defined.

A still further modified of sheet layer is shown at 50 in FIG. 5. The sheet layer 50 has a straight, thin, central portion 52 which acts as a hinge to allow thickened walls 54,56 to be folded relative to the center 52 into close proximity or abutting relationship. This hinge arrangement is preferred primarily for thicker layers.

The invention contemplates that the sheet layers 10,38,50 could be pre-bent and later "set" into a rigid shape or alternatively formed so that when treated, they tend to fold about, in the case of the sheet layer 10, the groove 12 and, in the case of the sheet layer 50, the center 52. The sheets layers 10,38,50 are immersed in a heated fluid, such as air and preferably an oil at a temperature of at least 300° F. In FIG. 5, a container 58 is shown in schematic form for containing a fluid 60 within which the sheet layer 50 can be immersed.

FIGS. 6–9 show another method of preforming a sheet layer that, when subjected to a treatment, rigidities in a folded state. A potato 62 is sliced using a cutting element 64 having a cutting blade 66 and a curved deforming deflecting surface 68. The cutting element 64 is designed to advance in the direction of the arrow 70 against, through, and beyond the potato 62.

The cutting blade 66 first contacts the potato 62 at a location below the top 72 of the potato a distance corresponding to the desired thickness of the potato slice/sheet layer 74. In FIG. 7 the cutting blade 66 is advanced partially through the potato 62. At a predetermined amount of penetration, the free end 76 of the potato slice 74 encounters the curved deforming surface 68 and wraps around to face in a leading direction, whereupon one wall 78 falls against and into contact with another wall 80 on the slice 74. By pre-bending the slice 74, the folded configuration can be maintained as the slice 74 is immersed in a heated fluid.

Another method of bending the sheet layers 82 is shown in FIG. 10. A rack 84 has first and second screen parts 86,88 joined to each other by a hinge 90 which permits relative pivoting of the screen portions 86,88 towards each other as indicated by the arrows 92, and away from each other, about an axis 93. The sheet layers 82 are placed on the rack 84 so that they overlie both of the screen portions 86,88 at the hinge 90. By then moving the screen portions 86,88 towards each other, the sheet layers 82 are controllably folded. The entire rack 84 with the sheet layers 82 thereon can be immersed in a heated fluid 94 within a container 96 so that the folded sheet layers are simultaneously cooked and their shapes set.

In FIGS. 11 and 12, a modified form of sheet layer 98 is shown with walls 100,102 folded against each other about a fold line 104 to define a chip 105. With the normal construction, the walls 100,102 would have oppositely opening ends 106,107. In this case, the end 107 is pinched, as by cooperating mold parts 108,110 (see FIG. 18) so that the sheet layer 98 defines an overall cup-shaped receptacle 112.

The invention contemplates that other than a slice of material can be used to define the sheet layer. For example, as shown in FIGS. 15–17, a sleeve 114 defines a sheet layer 116. The sleeve 114 can be formed by extrusion or can be rolled into the cylindrical shape. A wedge-shaped or cylindrically-shaped shaping element 118 can be placed in one end 120 of the sleeve 114. The other sleeve end 121 can be pinched/crimped, as with the cooperating mold parts 108,110. Again, a cup-shaped receptacle 122 is defined for the completed chip 125.

FIGS. 13 and 14 show a chip 105' folded sheet layer 126 with a triangularly shaped spacing element 128 having a teardrop shape in cross-section. The resulting chip 130 has an opening 132 corresponding to the cross-section of the shaping element 128. The opening 132 is bounded by walls 136,138.

The foregoing embodiments demonstrate many unique aspects of the present invention. However, the present invention and all related embodiments are to be considered in all respects as illustrative and not restrictive, and the invention is not to be limited to the details given herein. Thus, it will be understood that the invention may be embodied in other specific forms without departing from the spirit or central characteristics thereof.

What is claimed is:

1. A method of forming an edible chip, said method comprising the steps of:

providing a sheet layer of flexible edible material that can be flattened into a single layer thickness;

defining means on the sheet layer to allow the sheet layer to be consistently folded in a predetermined fashion about a fold line;

folding the sheet layer about the fold line to define first and second sheet layer walls which abut to each other at a first location spaced from the fold line and so that a space is defined between the sheet layer walls between the fold line and the first location; and treating the sheet layer to rigidify the sheet layer with the first and second sheet layer walls bent about the fold line so that the space is maintained between the sheet layer walls.

2. The method of forming an edible chip according to claim 1 including the step of forming the sheet layer by slicing a potato.

3. The method of forming an edible chip according to claim 1 including the step of forming the sheet layer from one of a paste and dough.

4. The method of forming an edible chip according to claim 1 including the step of defining a) cup-shaped receptacle between the first and second sheet layer walls with there being an entryway in communication with the receptacle as to allow a dip to be placed in the receptacle and b) a closed end for confining a dip in the receptacle.

5. The method of forming an edible chip according to claim 1 wherein the step of treating the sheet layer comprises at least one of immersing the sheet layer in a heated liquid and heating the sheet layer in dry air.

6. The method of forming an edible chip according to claim 5 wherein the step of treating the sheet layer comprises the step of immersing the sheet layer in oil heated to at least 300° F.

7. The method of forming an edible chip according to claim 1 including the step of placing a spacing element between the first and second sheet layer walls to define a receptacle between the first and second sheet layer walls.

8. The method of forming an edible chip according to claim 1 including the steps of providing a potato and a cutting element with a blade and a deflecting surface and advancing the cutting element against the potato to slice the sheet layer from the potato with the cutting blade and bending the sheet layer with the deflecting surface as the cutting element is advanced against the potato.

9. The method of forming an edible chip according to claim 1 wherein the step of defining means on the sheet layer comprises the step of making the sheet layer thinner at the fold line than the first and second sheet layer walls.

10. A method of forming an edible chip, said method comprising the steps of:

providing a sheet layer of flexible edible material that can be flattened into a single layer thickness, said sheet layer having oppositely facing first and second surfaces;

bending the sheet layer about a fold line so that the first surface abuts to itself at a first location spaced from the fold line to define first and second sheet layer walls with a space defined between the sheet layer walls at a midportion between the fold line and the first location; and treating the sheet layer to rigidify the sheet layer with the first and second sheet layer walls bent about the fold line.

11. The method of forming an edible chip according to claim 10 wherein the step of providing a sheet layer comprises the step of slicing a potato to define the sheet layer.

12. The method of forming an edible chip according to claim 11 wherein the step of providing a sheet layer comprises the step of providing a sheet layer that has no dimension over four inches.

13. A method of forming an edible chip, said method comprising the steps of:

providing a sheet layer of flexible edible potato material having a non-uniform thickness so that the sheet layer resultingly has a tendency to bend along a fold line in a predetermined fashion as a consequence of being at least one of heated and dried; and at least one of heating and drying the sheet layer so as to cause the sheet layer to bend along the fold line and rigidify in a final state.

14. The method according to claim 13 wherein the step of treating the sheet layer comprises the step of at least one of immersing the sheet layer in a heated liquid and heating the sheet layer in dry air.

15. An edible chip comprising:

a sheet layer made from an edible material that is pliable in a first state and shape retentive in a second state; and means on the sheet layer for facilitating bending of the sheet layer consistently at a fold line, said sheet layer being bent about the fold line in its first and second states so that the first surface on first and second walls defined by the sheet layer abuts to itself at a first location spaced from the fold line.

16. The edible chip according to claim 15 wherein said sheet layer is made from a potato.

17. The edible chip according to claim 15 wherein the sheet layer has a non-uniform thickness and the means on the sheet layer for facilitating bending of the sheet layer at the fold line comprises a portion of the sheet layer that is thinner than another portion of the sheet layer.

18. The edible chip according to claim 15 wherein the sheet layer has no dimension that is greater than 4 inches.

19. An edible chip comprising:

a sheet layer made from an edible material that is pliable in a first state and shape retentive in a second state; and means on the sheet layer for facilitating bending of the sheet layer consistently at a predetermined fold line to allow first and second walls on the sheet layer to bend relative to each other about the fold line in response to said sheet layer being immersed in a heated fluid.

* * * * *